US008257464B2

(12) United States Patent
Charbonnier et al.

(10) Patent No.: US 8,257,464 B2
(45) Date of Patent: Sep. 4, 2012

(54) PULVERULENT INTERMETALLIC MATERIALS FOR THE REVERSIBLE STORAGE OF HYDROGEN

(75) Inventors: Jean Charbonnier, Grenoble (FR); Patricia De Rango, Gieres (FR); Daniel Fruchart, Echirolles (FR); Salvatore Miraglia, Grenoble (FR); Sophie Rivoirard, Lans en Vercors (FR); Natalia Skryabina, Perm (RU)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 165 days.

(21) Appl. No.: 12/280,561

(22) PCT Filed: Feb. 22, 2007

(86) PCT No.: PCT/FR2007/000321
§ 371 (c)(1),
(2), (4) Date: Aug. 27, 2008

(87) PCT Pub. No.: WO2007/096527
PCT Pub. Date: Aug. 30, 2007

(65) Prior Publication Data
US 2010/0150822 A1    Jun. 17, 2010

(30) Foreign Application Priority Data
Feb. 23, 2006  (FR) ...................... 06 01615

(51) Int. Cl.
*B22F 1/00* (2006.01)
*B22F 9/00* (2006.01)
*B22F 9/16* (2006.01)
*C01B 3/00* (2006.01)
*C22C 1/00* (2006.01)
*C22C 1/02* (2006.01)

(52) U.S. Cl. ............... 75/352; 75/255; 75/343; 75/351; 75/354; 420/590; 420/591; 423/648.1

(58) Field of Classification Search .......... None
See application file for complete search history.

(56) References Cited

U.S. PATENT DOCUMENTS

| 4,728,586 A * | 3/1988 | Venkatesan et al. ........... 429/94 |
| 4,948,423 A | 8/1990 | Fetcenko et al. |
| RE34,588 E | 4/1994 | Hong |
| 6,656,246 B2 * | 12/2003 | Kanoya et al. ................. 75/352 |
| 2002/0029820 A1 | 3/2002 | Ovshinsky et al. |

FOREIGN PATENT DOCUMENTS

| WO | 00/13244 A | 3/2000 |
| WO | 02/071517 A1 | 9/2002 |

OTHER PUBLICATIONS

Hu et al, "Preparation and hydrogenation characteristics of Mg-30 wt.% Ti37.5V25Cr37.5 composite," 2004, Journal of Alloys and Compounds, vol. 375, pp. 265-269.*
Zhu et al., "Electrochemical studies on the Ti-Zr-V-Mn-Cr-Ni hydrogen storage electrode alloys," Intl J. Hydr. Ener., vol. 28, pp. 311-316 (2003).
Lupu et al., "Hydrogen absorption and electrode properties of $Zr_{1-x}Ti_xV_{1.2}Cr_{0.3}Ni_{1.5}$ Laves phases," J. of Alloys & Comp., vol. 312, pp. 302-306 (2000).
Chai et al., "Structure and electrochemical characteristics of $Ti_{0.25-x}Zr_xV_{0.35}Cr_{0.1}Ni_{0.3}$(x-0.05-0.15) alloys," Intermetallics, vol. 13, pp. 1141-1145 (2005).

* cited by examiner

*Primary Examiner* — Melvin C Mayes
*Assistant Examiner* — Colin W Slifka
(74) *Attorney, Agent, or Firm* — Young & Thompson

(57) ABSTRACT

The present invention relates to pulverulent materials suitable for storing hydrogen, and more particularly to a method of preparing such a material, in which: (A) a composite metallic material having a specific granular structure is prepared by co-melting the following mixtures: a first metallic mixture (m1), which is an alloy (a1) of body-centered cubic crystal structure, based on titanium, vanadium, chromium and/or manganese, or a mixture of these metals in the proportions of the alloy (a1); and a second mixture (m2), which is an alloy (a2), comprising 38 to 42% zirconium, niobium, molybdenum, hafnium, tantalum and/or tungsten and 56 to 60 mol % of nickel and/or copper, or else a mixture of these metals in the proportions of the alloy (a2), with a mass ratio (m2)/(m1+m2) ranging from 0.1 wt % to 20 wt %; and (B) the composite metallic material thus obtained is hydrogenated, whereby the composite material is fragmented (hydrogen decrepitation).

20 Claims, No Drawings

PULVERULENT INTERMETALLIC MATERIALS FOR THE REVERSIBLE STORAGE OF HYDROGEN

BACKGROUND OF THE INVENTION

1. Field of the Invention

The present invention relates to the storage of hydrogen on an industrial scale. It relates more specifically to materials which permit a reversible storage of hydrogen in the form of metal hydrides.

2. Description of the Related Art

Hydrogen ($H_2$) is used in numerous industrial fields, especially as a fuel (for example, in heat engines or fuel cells), or also as a reagent (typically for hydrogenation reactions). In this context, bearing in mind its volume in the gaseous state and its explosiveness, it is desirable for hydrogen to be stored in a form ensuring a small space requirement and safe containment.

Hydrogen is usually stored under pressure (so-called hyperbaric storage at pressures typically of the order of from 20 to 70 MPa) or in liquid form (at temperatures lower than or equal to 20.4 K). These storage methods are generally found to be expensive, particularly in terms of energy. In addition, they do not enable safety requirements to be fully satisfied, especially in the case of storage under pressure.

More advantageously, it has been proposed to store hydrogen in the form of hydrides. In this context, the hydrogen to be stored is typically brought into contact with a metallic material (generally an alloy) under pressure and temperature conditions which cause the hydrogen to be incorporated in atomic form in the crystal lattice, by conversion of the molecular hydrogen $H_2$ into a hydride (so-called hydrogen "charging" step). In order to recover the hydrogen thus stored, conditions of lower pressure and/or higher temperature, which promote the reverse reaction (hydrogen "discharge"), are required. In this context, it is possible to determine a "reversible storage capacity", expressed as a percentage by mass, which corresponds to the maximum amount of hydrogen which can be discharged by the storage material once it has been charged. For more details on the storage of hydrogen in the form of hydrides, reference may be made especially to *Hydrogen In Intermetallic Compounds I and II*, L. Schlapbach, Springer-Verlag, (1988).

Compared with the above-mentioned storages under pressure or at very low temperature, the above-mentioned storage of hydrogen in the form of hydrides permits safer storage, with a smaller space requirement and generally a lower cost, especially in terms of energy. Furthermore, hydrogen freed from hydrides has the advantage of being in a particularly pure form, which makes it especially suitable for use in devices of the fuel cell type or in fine chemistry reactions where it is desired to be free from the presence of impurities to the maximum extent.

In particular, the use of materials having a crystal structure of type $AB_2$ (such as $ZrCr_2$), or also materials comprising alloys of the type FeTi or $LaNi_5$, as Da metal compounds capable of ensuring the storage of hydrogen in the form of hydrides has been described (in this connection, reference may be made especially to the above-mentioned work *Hydrogen in Intermetallic Compounds I and II*). However, those materials are of limited interest because, although they lead to the above-mentioned advantages, they have mediocre performances, is especially in terms of reversible storage capacity. In particular, although the alloy FeTi is relatively inexpensive, it has a low reversible storage capacity (of the order of 1% by mass), which means that it is used only very selectively, for heavy-duty applications (for example in submarines). The $LaNi_5$ alloys for their part have much higher manufacturing costs with a reversible storage capacity which is still low (generally of the order of 1.4% by mass at the very most). As for materials having a crystal structure of type $AB_2$, their reversible storage performance is generally lower than 1.8% by mass and, in addition, they usually have stability problems after a few cycles of hydrogen charging and discharging.

More advantageously, in order to effect the reversible storage of hydrogen in the form of hydrides, it has been proposed to use alloys having a body-centred cubic crystal structure (referred to hereinafter as "B.C.C. alloys"), for example, alloys having the general formula TiVCr or TiVMn. Such B.C.C. alloys and their use in the storage of hydrogen have been described, in particular, by S. W. Cho, C. S. Han, C. N. Park, E. Akiba, in *J. Alloys Comp.*, vol. 294, p. 288, (1999), or by T. Tamura, M. Hatakeyama, T. Ebinuma, A. Kamegawa, H. Takamura, M. Okada, in *J. Alloys Comp.*, vol 505, pp. 356-357 (2003). B.C.C. alloys typically enable hydrogen to be stored with a reversible storage capacity which may reach values of the order of 2.5% by mass, or even more. Furthermore, these B.C.C. alloys are generally still efficient after several charging and discharging cycles. Moreover, the conditions of use of B.C.C. alloys are particularly advantageous inasmuch as the charging and discharging of these materials can be effected at temperatures from ambient temperature (typically 15 à 25° C.) to 100° C., without having to use hydrogen pressures higher than 1 MPa, which makes them the materials of choice for hydrogen storage.

Nevertheless, despite these various advantages, B.C.C. alloys generally have a relatively low reactivity, with reduced kinetics of hydrogen charging and discharging. Thus, it is typically observed that a solid ingot of a B.C.C. alloy having a volume of 2 $cm^3$ absorbs a maximum of the order of 0.1% by mass of hydrogen even when it is placed under a high hydrogen pressure and at high temperatures, for example at 3 MPa and at 250° C. for 3 days. In order to achieve the above-mentioned reversible storage capacities of the order of 2.5% by mass or more, it is necessary to use the B.C.C. alloy in a form having an adequate specific surface area capable of permitting a satisfactory exchange between the alloy and the hydrogen to be stored.

To that end, a preliminary mechanical milling of the alloys having a body-centred cubic crystal structure is generally carried out before they are brought into contact with the hydrogen. Apart from the fact that it is found to be expensive, both in terms of time and in terms of energy, such mechanical milling proves to be very difficult to implement, bearing in mind the particularly high mechanical resistance which alloys having a body-centred cubic crystal structure generally have. In fact, such mechanical milling only permits the production of coarse powders, unless particularly elaborate and expensive conditions of the type of the ball milling or melt spinning techniques are used, these being incompatible with a quantitative alloy preparation which can reasonably be exploited on an industrial scale. Thus, the powders obtained in accordance with the milling techniques applicable on an industrial scale typically have, at best, a grain size of the order of from 300 μm to 500 μm.

This grain size is found to be unsatisfactory in bringing about a really efficient incorporation of hydrogen, and a subsequent activation of the material is usually required, in particular in order further to improve the specific surface area. This activation generally uses a treatment of the alloy at high temperatures. Typically, it is recommended to subject the powder to an activation pretreatment, for example, in accordance with a method of the same type as those described by Cho et al. in *J. Alloys Comp.* vol. 45, pp. 365-357, (2002), which consists in subjecting the powder to the following conditions:
treatment under high vacuum at 500° C. for 1 hour;
cooling to ambient temperature;
placing under a hydrogen pressure of 5 MPa for 1 hour;
repetition of the above steps at least three times; and
placing under a final vacuum at 500° C. for one hour.
The necessity for such pretreatment of the powder makes the storage process even more burdensome, which is reflected, in particular, in terms of costs.

SUMMARY OF THE INVENTION

An object of the present invention is to provide a material for the storage of hydrogen, which is at least as efficient, and preferably more efficient, than the pretreated B.C.C. alloy powders of the above-mentioned type, and which is also accessible in accordance with a method of synthesis which is less expensive and simpler than the processes for the preparation of the B.C.C. alloy powders that are currently known.

In this context, the invention aims in particular to provide an industrially exploitable process which permits the direct and simple production of a material that is efficient in the storage of hydrogen without having to use the pretreatment steps necessary for the production of the reactive B.C.C. alloy powders that are currently known.

To that end, according to a first aspect, the present invention provides a specific process permitting the preparation of a pulverulent material suitable for the storage of hydrogen. More precisely, this process comprises the following steps:
(A) the preparation of a composite metallic material, by co-melting, then cooling, the following metallic mixtures:
a first metallic mixture (m1), which is:
an alloy (a1), having a body-centred cubic crystal structure, comprising titanium (Ti), vanadium (V), and another metal M selected from chromium (Cr), manganese (Mn), and mixtures of those metals; or
a mixture of the constituent metals of the alloy (a1), in the proportions of that alloy, those metals being present in the mixture in the state of isolated metals and/or in the state of metal alloys; and
a second mixture (m2), which is:
an alloy (a2), comprising:
from 38 to 42 mole % of a first metal M¹ selected from zirconium (Zr), niobium (Nb), molybdenum (Mo), hafnium (Hf), tantalum (Ta), tungsten (W), and mixtures of those metals; and
from 56 to 60 mole % of a second metal M², selected from nickel (Ni), copper (Cu), and mixtures of those metals; or
a mixture of the constituent metals of the alloy (a2), in the proportions of that alloy, those metals being present in the mixture in the state of isolated metals and/or in the state of metal alloys;
with a ratio by mass (m2)/(m1+m2) ranging from 0.1% to 20% by mass in the co-melting step;
and
(B) a hydrogenation of the composite metallic material obtained, permitting the conversion of at least a part of the metals present into metal hydrides, and leading to a fragmentation of the material in the form of a powder.

DETAILED DESCRIPTION OF THE INVENTION

In the sense in which it is used here, the expression "metallic mixture" denotes, very generally, a composition or an association of compositions comprising at least two metallic elements at their degree of oxidation 0, these metallic elements being present in the state of isolated metals and/or in the form of alloys. Such a metallic mixture does not necessarily comprise the various metals and/or alloys in the intimately mixed state. Thus, in accordance with one possible embodiment, the metals and/or alloys of a metallic mixture according to the invention may comprise a simple association of a first metal or alloy and a second metal or alloy, in the form of distinct batches, for example, in the form of physically distinct blocks. Nevertheless, it is usually preferred that the metals and/or metal alloys present in the mixtures (m1) and (m2) should be used in a divided form, for example, in the crushed state, or even in the state of a finer powder, which enables good homogenization to be obtained more rapidly during the co-melting of step (A).

In the process of the invention, the mixtures (m1) and (m2) used may be alloys (a1) and (a2), or associations of metals and/or alloys having, overall, the same composition as those alloys.

In the context of the present description, "metal alloy" means a monophase or polyphase composition comprising several metallic elements at their degree of oxidation 0, such as obtained after a joint melting of these metals. Apart from these metallic elements, an alloy according to the invention may optionally contain other minority species (often in distinct minority phases in the alloy), such as non-metallic elements (C, S, O, N or B, for example) or also metallic elements in the oxidized state, these optional minority species then being present preferably in a proportion of less than 5% by mass, preferably in a proportion of less than 2% by mass, and more advantageously in a proportion of less than 1% by mass relative to the total mass of the alloy considered.

More precisely, the alloys (a1) and (a2) that can be used according to the invention have the following specific characteristics.

The first alloy (a1) has a body-centred cubic crystal structure. Depending on the embodiment, this alloy may be monophase (alloy of the defined intermetallic compound type) or polyphase. It is in any case an alloy "comprising titanium, vanadium and another metal M (Cr and/or Mn)". This expression is understood to mean that the alloy (a1) contains, among other possible elements, titanium, vanadium and metal M (Cr and/or Mn), with oxidation state 0. These metallic elements (Ti, V and the metal M) generally predominate (by mass and by mole) in the alloy (a1), where they generally represent at least 90%, usually at least 95%, typically at least 98%, or even 99% by mass of the alloy (a1). In addition to these majority metallic constituents, the alloy (a1) may optionally contain other metallic elements, especially iron (Fe), cobalt (Co) or nickel (Ni).

According to one advantageous embodiment, the alloy (a1) corresponds to the general formula (I) below:

$$Ti_a V_b M_c M'_d \qquad (I)$$

wherein:
M has the above-mentioned meaning, and preferably denotes chromium (Cr), or a mixture of chromium and manganese, with manganese advantageously to predominating (by mole);
M' denotes a metal or a mixture of metals, other than Ti, V or Cr, for example selected from iron, cobalt, nickel, or mixtures of those metals;
a is a number ranging from 0.05 to 2.5, typically from 0.1 to 2, for example from 0.2 to 1.5;
b is a number ranging from 0.05 to 2.9, typically from 0.1 to 2.2;

c is a number ranging from 0.05 to 2.9, typically from 0.5 to 2.5; and d, optionally zero, is a number ranging from 0 to 0.5, this number preferably being less than 0.2, for example less than 0.1, the sum (a+b+c+d) being equal to 3.

More specifically, it is found to be advantageous to use an alloy (a1) corresponding to the general formula (Ia) below:

$$Ti_x N_y Cr_{3-(x+y)} \quad (Ia)$$

wherein:

x is a number ranging from 0.4 to 1, typically greater than or equal to 0.5; and y is a number ranging from 0.1 to 2.5, typically from 0.5 to 2.2, for example from 0.6 to 2, the sum (x+y) being typically greater than 1.5, and generally less than 2.5.

Alloys corresponding to the following general formulae:

$$TiV_{0.8}Cr_{1.2}$$

$$Ti_{0.9}V_{0.7}Cr_{1.4}$$

$$Ti_{0.833}V_{0.826}Cr_{1.334}$$

$$Ti_{0.7}V_{0.9}Cr_{1.4}$$

$$Ti_{0.66}VCr_{1.33}$$

$$Ti_{0.5}V_{1.9}Cr_{0.6}$$

may be mentioned, in a non-limiting manner, as examples of alloys particularly suitable as the alloy (a1) according to the invention.

Regardless of its exact composition, an alloy (a1) of the above-mentioned type can be prepared in accordance with methods known per se. In general, such an alloy is prepared by melting a mixture comprising, inter alia, titanium, vanadium and chromium and/or manganese (typically at temperatures of the order of from 1300 to 1700° C.). This melting is typically carried out by induction, usually under an atmosphere of a neutral gas (argon, for example), especially in order to prevent oxidation of the alloy.

The second alloy (a2) is for its part a monophase or polyphase metal alloy comprising the above-mentioned metals $M^1$ and $M^2$, which, in this case too, means that the alloy (a2) contains, inter alia, the metals $M^1$ and $M^2$, with oxidation state 0, generally as majority elements (by mass and by mole), these metals $M^1$ and $M^2$ usually being present in a proportion of a total amount representing at least 90%, generally at least 95%, typically at least 98%, or even 99% of the total mass of the alloy (a2). The alloy (a2) may optionally contain other elements, especially metallic elements such as cobalt, preferably in a proportion of less than 5% by mass relative to the total mass of the alloy (a2).

Advantageously, the alloy (a2) comprises at least one phase comprising a compound having a crystal structure corresponding to the space group Aba2 or C2ca. In this context, the alloy (a2) is preferably a substantially monophase alloy which is mainly constituted (namely typically in a proportion of at least 95%, or even at least 98% and more advantageously at least 99% by volume) by such a crystalline compound having an Aba2 or C2ca structure.

According to one particular embodiment, the alloy (a2) corresponds to the formula (II) below:

$$M^1_{7-m} M^2_{10-n} M^3_p \quad (II)$$

wherein:

$M^1$ denotes a first metal, selected from zirconium (Zr), niobium (Nb), molybdenum (Mo), hafnium (Hf), tantalum (Ta), tungsten (W), and is mixtures of those metals, $M^1$ preferably being Zr;

$M^2$ denotes a second metal, selected from nickel (Ni), copper (Cu), and mixtures of those metals, $M^2$ preferably denoting Ni;

$M^3$ denotes a metal or a mixture of metals, optionally present in the alloy, other than $M^1$ and $M^2$;

m is a positive or negative number, or zero, ranging from −0.1 to +0.1;

n is a positive or negative number, or zero, ranging from −0.1 to +0.1;

p is a positive number, or zero, ranging from 0 to 0.2.

More preferably, the alloy (a2) corresponds to the formula (IIa) below:

$$M^1_7 M^2_{10} \quad (IIa)$$

wherein $M^1$ and $M^2$ are as defined above.

In this context, the alloy (a2) advantageously corresponds to the following formula:

$$Zr_7 Ni_{10}$$

Regardless of its composition, the alloy (a2) can be prepared in a similar manner to the alloy (a1), typically by joint melting of its constituent elements, generally at from 1100° C. to 1500° C., usually by induction, advantageously under an atmosphere of a neutral gas, such as argon, in particular in order to prevent oxidation of the alloy.

In the process of the invention, the co-melting of the above-mentioned alloys (a1) and (a2), or, more generally, of metallic mixtures (m1) and (m2) comprising the metallic elements of those alloys in the proportions of the alloys (a1) and (a2), is carried out with a ratio by mass (m2)/(m1+m2) of from 0.1 to 20%.

The inventors have now demonstrated that this co-melting of the metallic mixtures (m1) and (m2), in the above-mentioned ratio by mass, leads, after cooling, to a very specific composite metallic material which has a novel property, namely that of fragmenting when subjected to hydrogenation (so-called hydrogen "crackling" phenomenon). This fragmentation leads to the production of a pulverulent material suitable for hydrogen storage.

Surprisingly, it is found that the fragmentation of the material in the form of a powder occurs by itself during step (B), that is to say, simply by bringing about a hydrogenation of the material, and without requiring any additional step. Thus, the implementation of steps (A) and (B) enables a material suitable for the storage of hydrogen to be obtained directly without having to use the expensive milling and pretreatment steps currently necessary for the preparation of high-performance storage materials.

The process of the invention is therefore found to be particularly well suited to implementation on an industrial scale, and all the more so as its steps are carried out using conventional techniques of melting and hydrogenation of the same type as those conventionally used in the field of the industrial manufacture of hydrogen storage materials.

The composite metallic material obtained at the end of step (A) of the process of the invention has a very specific bi- or multiphase structure which is generally fine and homogeneous and which comprises:

a majority phase comprising titanium, vanadium and chromium and/or manganese, dispersed in the form of grains typically having dimensions of from 10 to 100 microns, especially from 20 to 80 microns, for example from 40 to 50 microns, this majority phase having a body-centred cubic crystal structure; and at least one intergranular phase comprising a first metal selected from zirconium, niobium, molybdenum, hafnium, tantalum, tungsten, or a mixture of those metals; and a second metal selected from nickel, copper, or a mixture of those metals.

In this specific composite material, the majority-phase grains are dispersed in an intergranular medium comprising one or more phases. Thus, the intergranular phase(s) form walls between the dispersed grains. These walls generally have an average thickness of the order of a few microns (typically from 1 to 5 microns).

The above-mentioned composite material, obtained as an intermediate in the process of the invention, is a material which has a novel structure and which, to the inventors' knowledge, has not been described hitherto and which, according to one particular aspect, constitutes a further subject of the present invention.

In this composite material, the majority phase (or "intragranular" phase) generally has a composition relatively similar to that of the initial alloy (a1). The intergranular phase(s) comprise for their part usually the constituent metals of the alloy (a2). Nevertheless, it should be noted that the co-melting of step (A) may bring about phenomena of diffusion of some atoms between the alloys, as a result of which the compositions of the intragranular phase and the intergranular phase(s) may depart to a fairly great extent from the initial compositions of the alloys (a1) and (a2). Likewise, the crystal structure of the intragranular phase and the intergranular phase(s) may differ from those of the starting alloys. However, the intragranular majority phase of the composite material systematically preserves the body-centred cubic crystal structure of the starting alloy (a1).

It seems that the phenomenon of the crackling of the composite material which was observed by the inventors, and which is turned to good account in step (B) of the process, can be explained by the fact that the intergranular phases of the composite materials obtained in accordance with step (A) are mechanically less resistant and more reactive to hydrogenation than is the intragranular majority phase having a body-centred cubic structure. It therefore seems that the hydrogenation of the material is more effective at the level of the intergranular phases than at the level of the intragranular phase, which brings about very great mechanical stresses in the composite material, consequently embrittling the intergranular phases and ultimately leading to the fragmentation observed. In other words, in simple terms, the hydrogenation of step (B) may be regarded as leading to a separation of the grains of hydrogenated majority phase, the hydrogenation of the material bringing about an embrittlement of the intergranular phase such that the latter is no longer capable of acting as a grain binder.

The pulverulent material obtained after the hydrogen crackling of step (B) therefore generally comprises grains of hydrogenated majority phase which have essentially become separated from each other and which are covered, completely or in part, by hydrogenated intergranular phase. In the most common case, the grain size of the powder obtained at the end of step (B) therefore corresponds substantially to the average size of the grains of the majority phase of the composite material resulting from step (A), that is to say, a grain size of the order is of approximately 10 microns, typically of the order of from 40 to 50 microns. Thus, entirely unexpectedly, the inventors have now demonstrated that it is possible to obtain hydrogen storage materials in the form of powders having a grain size much finer than those resulting from the usual milling operations carried out on B.C.C. alloys, in an extremely simple manner and, surprisingly, without any milling step proving necessary.

The grain size of the powders that is obtained at the end of step (B) of the process of the invention is found to be particularly advantageous because, apart from the fact that it brings about a large specific surface area optimizing the exchanges between the hydrogen and the storage material, this particular grain size is found to be both sufficiently small to permit good diffusion of the hydrogen in the material (larger grain sizes would involve bulkier particles where this diffusion would be slowed down) and nevertheless sufficiently large to inhibit corrosion and the pyrophoric phenomena to which particles of smaller size would be sensitive. It is entirely surprising that the process of the invention enables such optimization of the particle size to be obtained directly.

In addition, the work of the inventors has demonstrated that the composite materials as obtained at the end of step (A) of the process of the invention behave in a very particular manner during the hydrogenation of step (B), which confers on them improved properties compared with monophase alloys having a body-centred cubic structure, especially in terms of capacity by mass for the reversible storage of hydrogen, reactivity and charging and discharging kinetics.

These improved properties can be explained at least in part by the presence of the intergranular phases which optimize the absorption properties of the alloys of body-centred cubic structure which are present in the intragranular majority phase. In this context, the work of the inventors has, in particular, demonstrated that the intergranular phases of the composite materials as obtained at the end of step (A) exhibit a high reactivity to hydrogenation, and especially a very good aptitude for decomposing molecular hydrogen $H_2$ into atomic hydrogen, coupled with excellent properties of diffusing the atomic hydrogen so formed, which promotes a very great diffusion of hydrogen around the cells of the majority phase during the hydrogenation of step (B). Therefore, the composite material reacts very rapidly to hydrogenation and it is observed, in particular, that the granular phase having a body-centred cubic structure is hydrogenated far more rapidly than if use were made only of this phase reduced to the state of a powder.

Thus, the intergranular phase of the composite materials of the invention plays a dual role in the hydrogen-absorption properties of the materials obtained according to the invention:

on the one hand, this intergranular phase is sufficiently brittle and reactive to bring about the crackling phenomenon of step (B), which leads to the production of a pulverulent material having a specific surface area and a grain size which are particularly well suited to subsequent cycles of charging and discharging hydrogen; and on the other hand, it constitutes an excellent vector for hydrogen towards the intragranular phase, which permits very efficient hydrogenation of the material as of the first hydrogenation.

Furthermore, the inventors have demonstrated that the pulverulant material as obtained at the end of step (B) of the process of the invention has a reversible storage capacity which generally remains stable over time, and usually does so s even after a large number of charging and discharging cycles. In particular, the hydrogen storage materials of the present invention are not subject to the demixing phenomena observed with some B.C.C. alloys, such as those described, for example, by H. Itoh, H. Arashima, K Kubo, T. Kabutomori and K. Ohnishi in *J. Alloys Comp*, vol. 404-406, pp. 417-420, (2005), for which a rapid degradation of the alloy structure by separation of the alloyed elements is observed after a few charging and discharging cycles, which then leads to a rapid loss of the reversible hydrogen storage properties.

By contrast, the hydrogen storage materials of the present invention is generally remain very stable over time, that is to say, without any modification of their structure substantially affecting their reversible storage capacity. In fact, variations over the first 5 to 10 charging and discharging cycles may be observed (but with losses which are usually small), the reversible storage capacity being substantially stabilized in the subsequent cycles, without any appreciable loss of capacity, and this usually even after 100 charging and discharging cycles, and even after 1000 cycles.

According to one particular embodiment of step (A) which is usually found to be particularly suitable and advantageous, the alloys (a1) and (a2) themselves, rather than other metallic mixtures, are used in step (A) as metallic mixtures (m1) and (m2), respectively. This embodiment generally permits optimization of the various advantages mentioned above and, in particular, it leads to a particularly fine and homogeneous grain size for the composite material resulting from step (A) and, de facto, for the powder obtained after the crackling of step (B). In the context of this variant, in order further to optimize the properties of the materials prepared, it is preferred to start from the most homogeneous alloys (a1) and (a2) possible. To that end, each of the alloys (a1) and (a2) is advantageously prepared by the induction-melting of its constituents, preferably under an inert gas, typically by high-frequency induction in a device of the cold crucible type. In order further to improve the homogeneity, the alloys may be subjected to several successive melting operations. Typically, three successive melting steps generally lead to satisfactory homogenization.

According to a further possible embodiment for step (A), by contrast a single metallic mixture (m1+m2) comprising the various constituent elements of the alloys (a1) and (a2) not alloyed in the form of those alloys (a1) and (a2) is used as the metallic mixtures (m1) and (m2). This metallic mixture (m1+m2) is advantageously a mixture of pure metals which are generally introduced in the divided state, for example, in the form of crushed lumps or powders. This second variant of step (A) generally leads to a composite material which has a coarser structure than that of the composite materials obtained according to the previous variant, often with less optimized properties for hydrogen storage. Nevertheless, this second variant is economically more advantageous than the previous variant because it does not require the implementation of the two melting steps necessary for the preparation of the alloys (a1) and (a2), and it therefore enables both the cost in terms of energy and the duration of the process to be reduced, which makes it an embodiment particularly suitable for large-scale industrial use.

More generally, regardless of the variant used and the exact nature of the mixtures (m1) and (m2) used, it is advantageous to carry out steps (A) and (B) under the conditions set out hereinafter.

In step (A), the co-melting of the alloy (a1) and the alloy (a2) can be carried out in accordance with any known method, provided that the alloys are heated to beyond the melting temperature of the mixture considered (generally known from the corresponding phase plot). Nevertheless, it is generally preferred to carry out this co-melting operation by induction heating, generally by high-frequency induction. This co-melting by induction is typically carried out in an induction crucible, advantageously in a device of the cold crucible type, which, in particular, enables the metallic phases to be stirred efficiently, thus facilitating the formation of the grain structure of the composite material. Typically, the co-melting of step (A) is carried out at temperatures of the order of from 1000 to 1800° C., for example from 1100 to 1300° C. Furthermore, the co-melting of step (A) can advantageously be carried out by using several successive melting operations. Generally, three successive melting steps in the above-mentioned temperature ranges result in a co-melting which is particularly well suited to the process of the invention.

An important feature in step (A) is the ratio by mass (m2)/(m1+m2). This ratio, which reflects the respective proportions of the mixtures (m1) and (m2) used, determines in part the structure of the composite material obtained at the end of step (A). In particular so that the effects of the presence of the intergranular phase should be as sensitive as possible in the composite material obtained, this ratio (m2)/(m1+m2) is advantageously at least 0.5% by mass, preferably at least 1% by mass, and more preferably at least 2% by mass. Nevertheless, in order to obtain particularly advantageous absorption properties, it is generally found to be preferable for the material to be composed substantially of majority phase. In this context, it is usually preferred for the ratio (m2)/(m1+m2) to be less than 15% by mass, advantageously less than 10% by mass, for example, less than 8%. Thus, according to one advantageous embodiment, the ratio (m2)/(m1+m2) in the co-melting step is from 3 to 6% by mass. Typically this ratio is of the order of 4% by mass.

When the alloy (a2) is used as the mixture (m2) in step (A), it is optionally possible to mill the alloy (a2) before the co-melting operation. Such milling, although not generally required, enables the amount of alloy (a2) introduced to be proportioned relative to the mass of the mixture (m1), which proves to be advantageous when it is desired to reach a predetermined ratio (m2)/(m1+m2). It should be noted that, bearing in mind the mechanical brittleness of the alloy (a2), it is much easier to mill this alloy (a2) than to mill an alloy having a body-centred cubic structure.

On the other hand, it is preferable not to use a step of milling the alloy (a2) when the latter is used as the mixture (m2). In this context, it should be emphasized that a step of milling the alloy (a2) is in no way required in order to obtain the composite material of step (A).

For its part, step (B) of the process of the invention can be carried out in accordance with any method known per se, provided that it is implemented under conditions of temperature and pressure sufficient to bring about the desired hydrogenation of the material. The temperature and pressure conditions required for this purpose may vary to a fairly large extent depending on the exact nature of the composite material which has been synthesized in step (A). However, step (B) does not usually have to be carried out at a temperature exceeding 150° C., nor at a hydrogen pressure higher than 1 MPa. Thus, step (B) can usually be carried out under gentle hydrogenation conditions, especially at from 15 to 100° C., and under a hydrogen pressure which is typically from 0.8 to 1 MPa. This very easy hydrogenation of the composite material is yet another advantage of the process of the present invention which is reflected in terms of reduced costs (low energy supply in particular) and increased safety (working under low pressure in particular), which makes the process particularly advantageous from an industrial point of view.

According to another aspect, the present invention relates also to the pulverulent materials comprising metal hydrides, as obtained at the end of the process of the invention.

These materials generally have a grain size of from 20 to 100 microns, preferably from 30 to 60 microns, for example from 40 to 50 microns. The "grain size" referred to here corresponds to the average size of the particles present in the pulverent material, as determined by laser granulometry, typically by means of a granulometer of the usual type, such as the Malvern Mastersizer 2000.

Furthermore, the pulverulent materials as obtained according to the invention typically have a specific surface area of from 0.01 to 0.1 m$^2$/g, usually of at least 0.2 m$^2$/g.

As emphasized above, these pulverulent materials are particularly suitable for the reversible storage of hydrogen in the form of hydrides.

They have a very high capacity for the reversible storage of hydrogen, which is usually greater than 2.5% by mass, or even higher than 3% by mass. They also have a high reactivity with respect to hydrogenation, with very high hydrogen charging and discharging kinetics, enabling hydrogen to be discharged from and recharged into the material in extremely short times of the order of a few minutes at the very most. Moreover, these materials have a very long shelf life, with very good resistance to cycling.

Apart from these advantages, it should also be emphasized that the PCI (Pressure Composition Isotherm) graphs of the storage materials of the invention also bring to light other advantageous characteristics compared with those of the C.C. materials conventionally used at present. There are thus observed, in particular, a to plateau of equilibrium of the material-hydrogen system which is flatter than in the case of C.C. materials and at a slightly higher pressure, and also a hysteresis between the curve recorded during hydrogen absorption and that recorded during the weaker hydrogen desorption, which, in particular, enables variations in pressure and reduced temperatures to be used in order to effect the charging and discharging of hydrogen.

The use of the pulverulent materials of the invention as material for the reversible storage of hydrogen in hydride form constitutes yet another subject of the present invention.

In this context, the materials of the invention act as reservoirs from which hydrogen can be extracted on demand by placing the material under conditions of temperature and pressure sufficiently low to ensure hydrogen desorption.

This method of reversible storage is found to be particularly advantageous in fields requiring the supply of particularly pure hydrogen flows under conditions of safety.

In particular, the materials of the invention can advantageously be used as reservoirs for supplying gaseous hydrogen in the following fields:

Static fuel cells (domestic or industrial)
Fuel cells for integrated applications (portable)
On-board fuel cells (boats, submarines, heavy vehicles . . . )
Heat engines (reciprocating, coils, . . . )
Fine chemistry.

In the context of these uses, the hydrogen storage materials of the invention are alternately "emptied" of their hydrogen (under conditions of sufficiently low temperature and sufficiently high pressure) and then "filled" with hydrogen again (in hydride form, at a higher temperature and/or at a lower pressure). The materials resulting from the dehydrogenation of the materials of the invention, which are in the form of a powder substantially free from hydrides and which are capable of subsequently being rehydrogenated, constitute, according to yet another aspect, a specific subject of the present invention.

The features and various advantages of the present invention will emerge even more clearly in the light of the illustrative examples set out hereinafter.

EXAMPLES

Example 1

Preparation of Pulverulent Materials for Hydrogen Storage

Step 1.1: Preparation of Alloys Comprising TiV and Cr (Alloys A1)

Various samples of alloy (referred to hereinafter as "alloys A1"), having a body-centred cubic structure, were synthesized by co-melting titanium, vanadium and chromium, which were introduced in variable proportions. The respective masses of the metals used in each case ($m_{Ti}$, $m_V$ and $M_{Cr}$ respectively) are compiled in Table 1 below:

TABLE 1

Alloys A1

| | Formula | $m_{Ti}$ | $m_V$ | $M_{Cr}$ |
|---|---|---|---|---|
| Alloy A1.1 | $TiV_{0.8}Cr_{1.2}$ | 6.338 g | 5.397 g | 8.624 g |
| Alloy A1.2 | $Ti_{0.9}V_{0.7}Cr_{1.4}$ | 5.685 g | 4.706 g | 9.608 g |
| Alloy A1.3 | $Ti_{0.833}V_{0.826}Cr_{1.334}$ | 5.269 g | 5.562 g | 9.169 g |
| Alloy A1.4 | $Ti_{0.7}V_{0.9}Cr_{1.4}$ | 4.407 g | 9.569 g | 6.027 g |
| Alloy A1.5 | $Ti_{0.66}VCr_{1.33}$ | 4.165 g | 6.717 g | 9.118 g |
| Alloy A1.6 | $Ti_{0.5}V_{1.9}Cr_{0.6}$ | 3.150 g | 12.743 g | 4.107 g |

Titanium (purity: 99.5%), vanadium (purity: 99.9%) and chromium (purity: 99.9%) were used as starting materials in the form of lumps having an average size of the order of 0.5 cm$^3$, which were obtained by crushing larger lumps resulting from the metallurgical industry.

For the synthesis of each of the alloys A1, the mixture of metals was co-melted in an induction crucible of the cold crucible type, having a power of 100 kW, at a temperature of from 1500 to 1700° C., under an argon atmosphere. In order to obtain a homogeneous composition, each sample was subjected to 3 successive induction-melting operations each lasting 3 minutes.

Step 1.2: Preparation of an Alloy $Zr_7Ni_{10}$ (Alloy A2)

An alloy A2 of formula $Zr_7Ni_{10}$ was prepared by co-melting 10.430 g of zirconium (purity: 99.9%) and 9.750 g of nickel (purity: 99.99%), which were both in the form of lumps having an average size of the order of 0.5 cm$^3$ and were obtained by crushing larger lumps resulting from the metallurgical industry, in the above-mentioned cold crucible, at a temperature of from 1100 to 1300° C., under an argon atmosphere. In this case too, the sample was subjected to 3 successive induction-melting operations.

Step 1.3: Co-Melting of the Alloys

Each of the alloys A1 synthesized in step 1.1 was co-melted with the alloy A2 of step 1.2, with in each case, a ratio by mass A2/(A1+A2) equal to 4%. For this purpose, in each case 30 g of alloy of type (a1) and 1.2 g of alloy $Zr_7Ni_{10}$ were used.

The co-melting of the mixture was carried out in the above-mentioned cold crucible, at a temperature of from 1200 to 1300° C., under an argon atmosphere. In this case too, the sample was subjected to 3 successive induction-melting operations each lasting 3 minutes.

The composite metallic materials M1 to M6 indicated in Table 2 below were thus obtained:

TABLE 2 composite materials obtained by co-melting the alloys A1 and A2

| Composite material | Alloy A1 used | Alloy A2 used | Ratio by mass A2/(A1 + A2) |
|---|---|---|---|
| M1 | $TiV_{0.8}Cr_{1.2}$ | $Zr_7Ni_{10}$ | 4% |
| M2 | $Ti_{0.9}V_{0.7}Cr_{1.4}$ | $Zr_7Ni_{10}$ | 4% |
| M3 | $Ti_{0.833}V_{0.826}Cr_{1.334}$ | $Zr_7Ni_{10}$ | 4% |
| M4 | $Ti_{0.7}V_{0.9}Cr_{1.4}$ | $Zr_7Ni_{10}$ | 4% |
| M5 | $Ti_{0.66}VCr_{1.33}$ | $Zr_7Ni_{10}$ | 4% |
| M6 | $Ti_{0.5}V_{1.9}Cr_{0.6}$ | $Zr_7Ni_{10}$ | 4% |

Observation of the materials by electron microscopy confirmed the grain structure in each case, with grains having a size of the order of from 40 to 50 microns, and a thickness of the intergranular phase of the order of a few microns. The crystal structure of the various phases was determined by X-ray diffraction using a Siemens D-5000 diffractometer using the radiation of the copper $K_\alpha$ line, which confirmed the presence of an intragranular phase having a C.C. structure and the presence of intergranular phases of the type $Ti_2Ni$ and ZrCrNi.

Step 1.4: Treatment with Hydrogen

Each of the materials M1 to M6 obtained at the end of step 1.3 was subjected to hydrogenation under a stream of hydrogen at a temperature of from 20 to 40° C., at a pressure of 1 MPa, for 30 minutes, which resulted in a fragmentation of the material in the form of a powder.

Starting from each of the materials M1 to M6, powders comprising metal hydrides P1 to P6, respectively, each having a very narrow grain-size range, centred on 40 microns, were thus obtained.

Example 2

Tests for the Reversible Storage of Hydrogen by the Materials of Example 1

In order to demonstrate their reversible storage properties, each of the powders P1 to P6 prepared in the previous Example was subjected to the following conditions:
hydrogen desorption by heating at 150° C. for one hour under a low vacuum ($10^{-4}$ Pa)
subjection of the sample so obtained to three successive cycles of absorption at 50° C., 1 MPa then desorption at 250° C., 2 kPa.
The PCI graphs obtained enabled the following reversible hydrogen storage capacities to be determined ($C_H$, as % by mass):

| Material | P1 | P2 | P3 | P4 | P5 | P6 |
|---|---|---|---|---|---|---|
| $C_H$ | 2.1% | 1.7% | 1.9% | 2.2% | 2.2% | 2.5% |

The invention claimed is:

1. A process for preparing a pulverulent material suitable for storage of hydrogen, comprising:
(A) preparation of a composite metallic material, by co-melting, then cooling, a plurality of metallic mixtures comprising:
a first metallic mixture (m1), which is:
an alloy (a1), having a body-centred cubic crystal structure, comprising titanium, vanadium, and another metal M selected from chromium, manganese, or mixtures of those metals; or
a mixture of constituent metals of the alloy (a1), in proportions of that alloy, the constituent metals of the alloy (a1) being present in the mixture in a state of isolated metals and/or in a state of metal alloys; and
a second mixture (m2), which is:
an alloy (a2), comprising:
from 38 to 42 mole % of a first metal $M^1$ selected from zirconium, niobium, molybdenum, hafnium, tantalum, tungsten, or mixtures of those metals; and
from 56 to 60 mole % of a second metal $M^2$, selected from nickel, copper, or mixtures of those metals; or
a mixture of constituent metals of the alloy (a2), in proportions of that alloy, the constituent metals of the alloy (a2) being present in the mixture in the state of isolated metals and/or in the state of metal alloys;
with a ratio by mass (m2)/(m1+m2) ranging from 0.1% to 20% by mass in the co-melting step,
wherein the composite metallic material obtained at the end of step A comprises:
a majority phase comprising titanium, vanadium and chromium and/or manganese, dispersed as grains, the majority phase having a body-centered cubic crystal structure, and
at least one intergranular phase comprising at least one first metal selected from the group consisting of zirconium, niobium, molybdenum, hafnium, tantalum and tungsten, and at least one second metal selected from the group consisting of nickel and copper; and
(B) a hydrogenation of the composite metallic material obtained, permitting the conversion of at least a part of the metals present into metal hydrides, wherein said hydrogenation causes fragmentation of the composite metallic material to a powder.

2. The process according to claim 1, wherein the alloys (a1) and (a2) themselves are used as metallic mixtures (m1) and (m2), respectively.

3. The process according to claim 1, wherein a single mixture (m1+m2) comprising the various constituent elements of the alloys (a1) and (a2) not alloyed in the form of the alloys (a1) and (a2) is used as mixtures (m1) and (m2).

4. The process according to claim 1, wherein the alloy (a1) corresponds to general formula (I) below:

$$Ti_aV_bM_cM'_d \qquad (I)$$

wherein:
M denotes Cr, Mn, or a mixture thereof;
M' denotes a metal or a mixture of metals, other than Ti, V or Cr;
a is a number ranging from 0.05 to 2.5;
b is a number ranging from 0.05 to 2.9;
c is a number ranging from 0.05 to 2.9; and
d is a number ranging from 0 to 0.5,
a sum (a+b+c+d) being equal to 3.

5. The process according to claim 1, wherein the alloy (a1) corresponds to general formula (Ia) below:

$$Ti_xV_yCr_{3-(x+y)} \qquad (Ia)$$

wherein:
x is a number ranging from 0.4 to 1; and
y is a number ranging from 0.1 to 2.5,
where a sum (x+y) is from 1.5 to 2.5.

6. The process according to claim 5, wherein the alloy (a1) corresponds to one of following formulae:

$$TiV_{0.8}Cr_{1.2};$$

$$Ti_{0.9}V_{0.7}Cr_{1.4};$$

$Ti_{0.833}V_{0.826}Cr_{1.334}$;

$Ti_{0.7}V_{0.9}Cr_{1.4}$;

$Ti_{0.66}VCr_{1.33}$;

or $Ti_{0.5}V_{1.9}Cr_{0.6}$.

7. The process according to claim 1, wherein the alloy (a2) corresponds to formula (II) below:

$$M^1_{7-m}M^2_{10-n}M^3_p \qquad (II)$$

wherein:
$M^1$ denotes a first metal, selected from zirconium, niobium, molybdenum, hafnium, tantalum, tungsten, or mixtures thereof;
$M^2$ denotes a second metal, selected from nickel, copper, or mixtures s thereof;
$M^3$ denotes a metal or a mixture of metals, optionally present in the alloy, other than $M^1$ and $M^2$;
m is a positive or negative number, or zero, ranging from −0.1 to +0.1;
n is a positive or negative number, or zero, ranging from −0.1 to +0.1;
p is a positive number, or zero, ranging from 0 to 0.2.

8. The process according to claim 7, wherein the alloy (a2) corresponds to formula (IIa) below:

$$M^1_7 M^2_{10} \qquad (IIa)$$

wherein $M^1$ and $M^2$ are as previously defined.

9. The process according to claim 8, wherein the alloy (a2) corresponds to a following formula:

$Zr_7Ni_{10}$.

10. The process according to claim 1, wherein, in the co-melting of step (A), the ratio by mass (m2)/(m1+m2) is from 0.5 to 15% by mass.

11. The process according to claim 1, wherein the co-melting of step (A) is carried out by induction heating.

12. The process according to claim 1, wherein step (B) is carried out by treating the composite material obtained according to step (A) with hydrogen at a temperature of from 15 to 100° C. and under a hydrogen pressure of from 0.8 to 1 MPa.

13. The process according to claim 1, wherein, in the co-melting of step (A), the ratio by mass (m2)/(m1+m2) is from 1 to 10% by mass.

14. The process according to claim 1, wherein the co-melting of step (A) is carried out by induction heating in an induction crucible.

15. The process according to claim 1, wherein the majority phase forms grains having a size of 10 to 100 μm.

16. The process according to claim 1, wherein the majority phase forms grains having a size of 20 to 80 μm.

17. The process according to claim 1, wherein the majority phase forms grains having a size of 40 to 50 μm.

18. The process according to claim 1, wherein the intergranular phase forms walls between grains of the majority phase.

19. The process according to claim 18, wherein the walls have an average thickness of 1 to 5 μm.

20. A process for preparing a pulverulent material suitable for storage of hydrogen, comprising:
A) Preparation of a composite metallic material, by co-melting, then cooling, a plurality of metallic mixtures including:
a first metallic mixture (m1), which is:
an alloy (a1), having a body-centred cubic crystal structure, comprising titanium, vanadium, and another metal M selected from chromium, manganese, or mixtures of those metals; or
a mixture of constituent metals of the alloy (a1), in proportions of that alloy, the constituent metals of the alloy (a1) being present in the mixture in a state of isolated metals and/or in a state of metal alloys; and
a second mixture (m2), which is:
an alloy (a2), comprising:
from 38 to 42 mole % of a first metal $M^1$ selected from zirconium, niobium, molybdenum, hafnium, tantalum, tungsten, or mixtures of those metals; and
from 56 to 60 mole % of a second metal $M^2$, selected from nickel, cooper, or mixtures of those metals; or
a mixture of constituent metals of the alloy (a2), in proportions of that alloy, the constituent metals of the alloy (a2) being present in the mixture in the state of isolated metals and/or in the state of metal alloys;
with a ratio by mass (m2)/(m1+m2) ranging from 0.1% to 20% by mass in the co-melting step;
wherein the composite metallic material obtained at the end of step A comprises:
a majority phase comprising titanium, vanadium and chromium and/or manganese, dispersed as grains, the majority phase having a body-centred cubic crystal structure; and
at least one intergranular phase comprising at least one first metal selected from zirconium, niobium, molybdenum, hafnium, tantalum, and tungsten; and at least one second metal selected from nickel, and copper; and
(B) a hydrogenation of the composite metallic material obtained, wherein said composite metallic material fragments when subjected to said hydrogenation, thereby giving a pulverulent material.

* * * * *